(12) United States Patent
Straubel

(10) Patent No.: US 11,772,827 B2
(45) Date of Patent: Oct. 3, 2023

(54) DEVICE AND METHOD FOR UNFOLDING A ROLLED-UP ELONGATE HOLLOW MEMBER

(71) Applicant: Deutsches Zentrum für Luft-und Raumfahrt e.V., Cologne (DE)

(72) Inventor: Marco Straubel, Magdeburg (DE)

(73) Assignee: DEUTSCHES ZENTRUM FÜR LUFT-UND RAUMFAHRT E.V., Cologne (DE)

( * ) Notice: Subject to any disclaimer, the term of this patent is extended or adjusted under 35 U.S.C. 154(b) by 554 days.

(21) Appl. No.: 16/840,859

(22) Filed: Apr. 6, 2020

(65) Prior Publication Data

US 2020/0324921 A1    Oct. 15, 2020

(51) Int. Cl.
*B64G 1/22* (2006.01)
*B64G 1/10* (2006.01)

(52) U.S. Cl.
CPC ...... *B64G 1/222* (2013.01); *B64G 2001/1092* (2013.01); *B64G 2001/224* (2013.01)

(58) Field of Classification Search
CPC ............ B64G 1/222; B64G 2001/1092; B64G 2001/224; E04C 3/005; E04C 3/00; H01Q 1/081
See application file for complete search history.

(56) References Cited

U.S. PATENT DOCUMENTS 3,361,377 A * 1/1968 Trexler, Jr. ............... E04C 3/005
242/918
3,434,674 A * 3/1969 Groskopfs ............. H01Q 1/087
242/390.2

(Continued)

FOREIGN PATENT DOCUMENTS

DE    19825785 A1   12/1999
DE   102004021569 A1   12/2005

(Continued)

*Primary Examiner* — Medhat Badawi
(74) *Attorney, Agent, or Firm* — WCF IP

(57) ABSTRACT

The invention relates to a device for unfolding a rolled-up elongate hollow member having:
  at least one elongate hollow member which has two elongate shell member halves, and
  an unfolding mechanism which has a fixed base structure and a winding core which is rotatably supported on the base structure and on which the at least one elongate hollow member in a first state is rolled up and compressed and which by rotating moves and unfolds the elongate hollow member from the first state into an unrolled and unfolded second state so that an elongate hollow space is formed between the two shell member halves of the at least one elongate hollow member,
wherein the at least one elongate hollow member has as a first end a hollow member root, via which the elongate hollow member is secured to the rotatably supported winding core,
wherein
the first shell member half of the at least one elongate hollow member is secured in the region of the hollow member root to the rotatably supported winding core, and
the unfolding mechanism has an expansion mechanism which in the region of the hollow member root is in engagement with the second shell member half and which moves the second shell member half in the region of the hollow member root away from the rotatably supported winding core in order to expand the cross-section of the at least one elongate hollow member in the region of the hollow member root when the elongate hollow member is unrolled from the rotatably supported winding core.

13 Claims, 9 Drawing Sheets

(56) References Cited

U.S. PATENT DOCUMENTS

Figure 1:
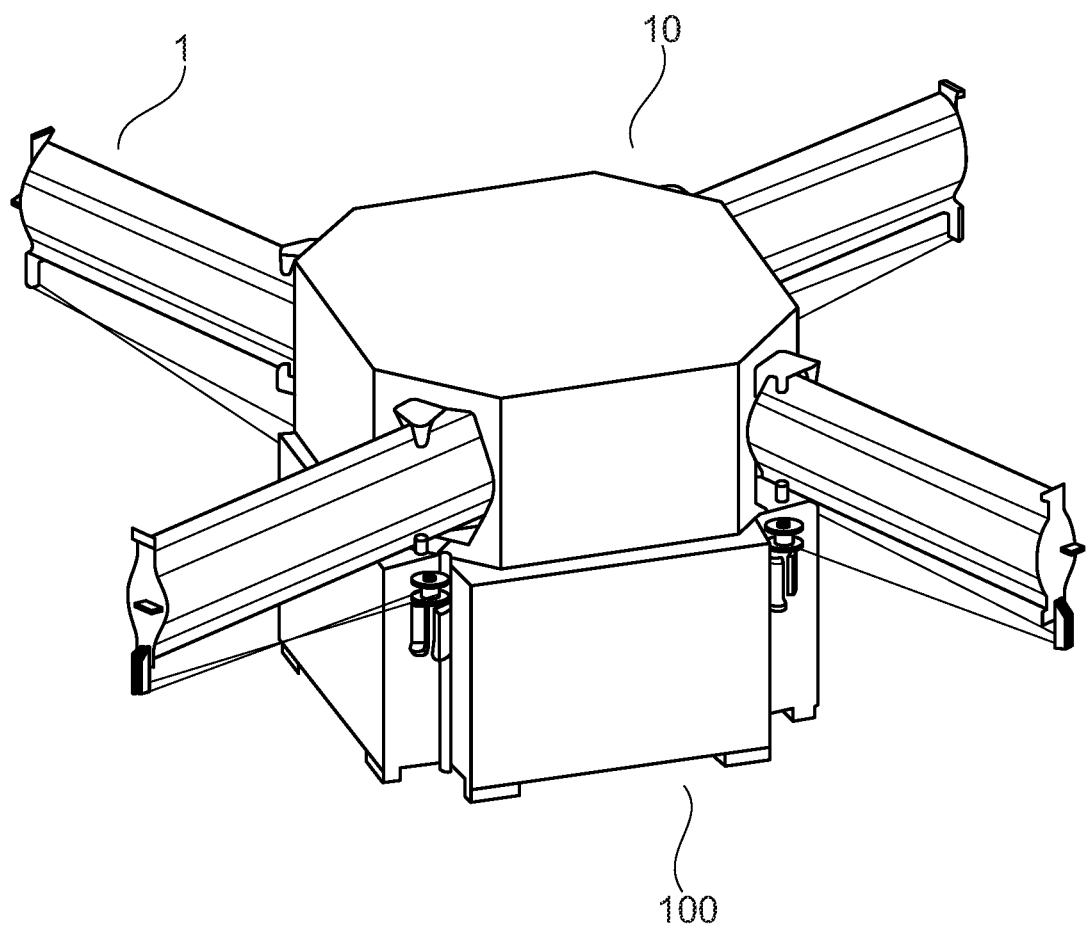

| | | | | |
|---|---|---|---|---|
| 3,589,632 | A * | 6/1971 | Rew | F16H 19/064 |
| | | | | 436/805 |
| 3,862,528 | A * | 1/1975 | Meissinger | E04C 3/005 |
| | | | | 242/390.2 |
| 4,195,804 | A * | 4/1980 | Hujsak | B64G 1/646 |
| | | | | 244/172.4 |
| 5,094,410 | A * | 3/1992 | Johnson | B64G 1/646 |
| | | | | 244/172.4 |
| 6,126,115 | A * | 10/2000 | Carrier | B64G 1/641 |
| | | | | 294/82.26 |
| 6,508,036 | B1 * | 1/2003 | Cadogan | B64G 1/222 |
| | | | | 52/750 |
| 7,828,249 | B2 * | 11/2010 | Ritter | B64G 1/646 |
| | | | | 244/172.4 |
| 7,857,261 | B2 * | 12/2010 | Tchoryk, Jr. | B64G 1/646 |
| | | | | 280/514 |
| 9,764,478 | B2 * | 9/2017 | Roberts | B25J 15/0226 |
| 10,196,817 | B2 * | 2/2019 | Rakow | E04C 3/005 |
| 10,611,502 | B2 * | 4/2020 | Hensley | B64G 1/222 |
| 11,047,132 | B2 * | 6/2021 | Turse | E04C 3/005 |
| 11,643,226 | B1 * | 5/2023 | Markcity | B64G 1/646 |
| | | | | 244/172.4 |
| 2011/0253827 | A1 * | 10/2011 | Watanabe | E04H 12/185 |
| | | | | 242/370 |
| 2013/0061541 | A1 * | 3/2013 | Taylor | F16S 5/00 |
| | | | | 52/741.1 |
| 2014/0042275 | A1 * | 2/2014 | Abrams | B64G 1/407 |
| | | | | 244/172.6 |
| 2014/0123575 | A1 * | 5/2014 | Bobbio | B25J 9/104 |
| | | | | 52/108 |
| 2014/0151485 | A1 * | 6/2014 | Baudasse | B65H 75/34 |
| | | | | 242/375 |
| 2015/0259911 | A1 * | 9/2015 | Freebury | B32B 5/00 |
| | | | | 52/108 |
| 2015/0368903 | A1 * | 12/2015 | Turse | B65H 75/4402 |
| | | | | 242/407 |
| 2016/0032609 | A1 * | 2/2016 | Kucinski | B21C 37/0818 |
| | | | | 52/108 |
| 2016/0068281 | A1 * | 3/2016 | Baudasse | H01Q 1/1235 |
| | | | | 244/172.6 |
| 2016/0311558 | A1 * | 10/2016 | Turse | B64G 1/222 |
| 2017/0058524 | A1 * | 3/2017 | Fernandez | E04C 3/005 |
| 2017/0096240 | A1 * | 4/2017 | Cook | B64G 1/646 |
| 2017/0298628 | A1 * | 10/2017 | Rakow | E04C 3/005 |
| 2019/0374870 | A1 * | 12/2019 | Brezan | A63J 3/00 |
| 2019/0382231 | A1 * | 12/2019 | Hillebrandt | B65H 75/4471 |
| 2019/0393615 | A1 * | 12/2019 | Taylor | H01Q 15/141 |
| 2020/0002027 | A1 * | 1/2020 | Borrego Borrego | B64G 1/12 |
| 2020/0231308 | A1 * | 7/2020 | Ruhl | H01Q 1/087 |
| 2020/0247564 | A1 * | 8/2020 | Villemain | B64G 1/22 |
| 2020/0324921 | A1 * | 10/2020 | Straubel | B64G 1/222 |
| 2020/0411998 | A1 * | 12/2020 | Mast | H01Q 21/20 |
| 2021/0381645 | A1 * | 12/2021 | Sogame | B64G 1/222 |
| 2022/0041302 | A1 * | 2/2022 | Sippel | B64G 1/407 |

FOREIGN PATENT DOCUMENTS

| | | |
|---|---|---|
| DE | 10 2018 105 765 A1 | 9/2019 |
| DE | 102018105765 A1 | 9/2019 |
| DE | 10 2018 112 690 A1 | 11/2019 |
| DE | 10 2018 112 691 A1 | 11/2019 |
| DE | 102019109810 A1 | 10/2020 |
| FR | 2998876 A1 | 6/2014 |
| WO | WO-2018189633 A1 * | 10/2018 |

* cited by examiner

DEVICE AND METHOD FOR UNFOLDING A ROLLED-UP ELONGATE HOLLOW MEMBER

The invention relates to a device for unfolding at least one rolled-up elongate hollow member which in a first state is rolled up and compressed on a winding core and which by rotating the winding core can be moved into a second unrolled and unfolded state. The invention also relates to an operating method for this.

Since the beginning of space travel, masts have been used as carriers for sensors and instruments as a supporting structure for solar arrays, antennae and solar sails and for other applications. Since, however, even today the transport of goods, such as, for example, satellites, are subject to a strict weight and space restriction, masts which protrude from the transported goods represent a not inconsiderable problem. Therefore, unfoldable masts are very often used and are initially prepared in a rolled-up and compressed state for transport and then at the destination are unrolled and unfolded, whereby they obtain their corresponding stability and can accordingly support the corresponding instruments, sensors or solar sails.

Such an unfoldable mast is in this instance generally an elongate hollow member whose cross-section is configured in such a manner that the elongate hollow member can be shaped to form a flat strip. Depending on the construction, this flat strip has the tendency to unfold and can consequently form the corresponding hollow space inside the elongate hollow member.

In the context of the present invention, an elongate hollow member is intended to be understood to be a component which may be present both in the unfolded and in the rolled-up state and which in the rolled-up state has no hollow space. The term "elongate hollow member" defines in this instance in the broadest sense the ability to form such a hollow space within the elongate hollow member, that is to say, when the elongate hollow member is unrolled and unfolded.

Such an elongate hollow member which is intended to be used as an unfoldable mast, in particular in space travel, is in this instance generally rolled up on a winding core, whereby it is necessarily present as a flat strip accordingly rolled up on the winding core and compressed. If the winding core is now rotated about the axis thereof, the rolled-up elongate hollow member is moved from the rolled-up and compressed first state thereof into an unrolled and unfolded second state, wherein during the unrolling from the winding core the elongate hollow member assumes the original cross-sectional shape thereof again or a transitional cross-sectional shape and unfolds and consequently correctly forms the hollow space within the elongate hollow member.

Such unfoldable masts are in this instance produced in most cases from thin-walled shells comprising metal or fiber-composite materials, wherein the individual shells as a result of their small wall thickness resiliently deform to form a flat strip and can thereby be rolled up on the winding core in a space-saving manner. There is thus known, for example, from the subsequently published DE 10 2018 105 765 A1 a shell mast which can be rolled up and which is produced completely from a fiber-composite material, having a fiber material and a matrix material in which the fiber material is embedded. In this instance, the shell mast which can be rolled up is formed from at least two fiber-composite half-shells which are accordingly connected to each other in a joining wall region in a positive-locking, non-positive-locking and materially engaging manner. As a result of this principle of half-shell production, such elongate hollow members can be compressed and rolled up on a winding core to form a flat strip. In the compressed and rolled-up state, the joining edge regions of the two fiber-composite half-shells form the elongate edge region of the compressed hollow member, which is wound up as a flat strip.

A structurally critical feature with such elongate hollow members which are intended to be used as unfoldable shell masts is inter alia the transition region between the still rolled-up pressed-flat portion of the hollow member and the already completely unfolded portion. In this transition region, the cross-section of the elongate hollow member is not yet completely developed, whereby both the rigidity and the stability are significantly reduced. In practice, the transition region is therefore stabilized externally with additional supporting elements, such as external shaped shells or external guide rollers, in order to thus be able to accordingly absorb the generally higher loads during unfolding in the transition region.

There is known from the subsequently published DE 10 2018 112 690.5 an unfolding mechanism for rolled-up elongate hollow members in which there is provided in the transition region an internal supporting element which engages in a positive-locking manner in an external fixing element, wherein the elongate hollow member can be guided through between the internal supporting element and the external fixing element and the fixing element, as a result of the positive-locking engagement, fixes the internal supporting element axially in its position. It is thereby possible to also support shell masts which can be rolled up with a closed cross-section in the transition region.

There is also known from the subsequently published DE 10 2018 112 691.3 an unfolding mechanism for elongate hollow members in which the transition region between the fully unfolded elongate hollow member and the securing of the elongate hollow member is supported on the winding core by means of a locking device which after completely unrolling the elongate hollow member engages in a positive-locking manner in a recess in the covering face of the winding core and thus, on the one hand, fixes the winding core in a rotationally secure manner and, on the other hand, supports it in the transition region.

Such unfolding mechanisms known from the prior art have in this instance the disadvantage that the connection of the hollow member which can be rolled up to the winding core still represents a weak point which in spite of the additional supporting and guiding elements cannot be sufficiently eliminated. Therefore, both the unfolding mechanism and the mast itself may have in the region of the connection to the winding core increased cross-sections or wall thicknesses, wherein, as a result of the additional supporting elements, more mass is introduced into the unfolding mechanism. Particularly in the field of space travel structures, however, the mass/volume ratio of such structures is an important if not even essential criterion.

An object of the present invention is therefore to provide an improved device and a related method for unfolding at least one rolled-up elongate hollow member, which can be connected in an operationally reliable manner to the unfolding mechanism in the unrolled state and which further prevents the weak locations in the transition region.

The object is achieved according to the invention with the device according to claim 1 and the method according to claim 9.

According to claim 1, a device for unfolding at least one rolled-up elongate hollow member is proposed according to the generic type, wherein the device has at least one elongate hollow member which has two elongate shell member halves. A shell member half may in this instance be composed of more than one shell element so that the elongate shell member half does not necessarily have to be an integral component. The shell member halves may in this instance be formed from a fiber-composite material, having a fiber material and a matrix material which embeds the fiber material, wherein it is then preferable for the shell member halves to each be constructed integrally and in one piece. The shell member halves of the elongate hollow member are in this instance assembled to form the elongate hollow member in such a manner that they can be compressed to form a flat strip, wherein the joint region of the two shell member halves, if they are not constructed overall in one piece, are located in the edge region of the compressed flat strip.

Consequently, the elongate hollow member is a component which has two shell member halves which are constructed in such a manner that the elongate hollow member can be compressed and can be rolled up to form a flat strip. This can be achieved by the two shell member halves being produced separately and then joined in the respective edge regions. However, it is also conceivable for such an elongate hollow member to be constructed integrally, that is to say, in one piece, wherein in the edge regions a type of flexure bearing is then provided in order to thus compress the elongate hollow member to form a flat strip. In the mentioned joint region or articulation region, the material direction or the material path is diverted through 180°.

In the compressed and rolled-up state, the shell member halves rest on each other and thus eliminate the hollow space formed by the elongate hollow members in the unrolled state.

Furthermore, the device has an unfolding mechanism which has a fixed base structure and a winding core which is rotatably supported on the base structure. In this instance, at least one elongate hollow member, preferably two elongate hollow members, is/are rolled up and compressed on the winding core in a first state. In a first rolled-up and compressed state, the at least one elongate hollow member is in this instance rolled up as an elongate flat strip on the winding core and thus forms the state which in particular is required in space travel structures for transport. At the respective destination, by rotating the winding core of the unfolding mechanism, the elongate hollow member is then moved from the first state into an unrolled and unfolded second state so that an elongate hollow space is formed between the two shell member halves of the at least one elongate hollow member. By unrolling the rolled-up elongate hollow member, the cross-section of the elongate hollow member expands by the two shell member halves pressing away from each other so that the elongate hollow member reaches its original cross-section.

The at least one elongate hollow member has at the first end thereof a hollow member root via which the elongate hollow member is secured to the rotatably supported winding core. This securing of the hollow member root to the rotatably supported winding core ensures that the entire hollow member is connected in the second state thereof securely to the entire unfolding mechanism. The connection of the hollow member root to the rotatably supported winding core consequently ensures the interface between the mast and satellite of a space travel structure.

According to the invention, it is now proposed that the first shell member half of the at least one elongate hollow member is secured in the region of the hollow member root to the rotatably supported winding core (for example, in a positive-locking, non-positive and/or materially engaging manner), whilst the second shell member half in the region of the hollow member root is in engagement with an expansion mechanism in such a manner that, after the unfolding and movement of the elongate hollow member into the second state, the elongate hollow member is expanded in the region of the hollow member root by the second shell member half being moved away from the rotatably supported core using the expansion mechanism. As a result of this movement away of the second shell member half, the original cross-section of the elongate hollow member is also produced in the region of the hollow member root so that there is no longer a transition region until the portion in which the cross-section of the elongate hollow member is fully unfolded is reached.

Since the expansion mechanism is a component of the unfolding mechanism and the second shell member half is also in engagement with the expansion mechanism in the region of the hollow member root, the entire elongate hollow member is fixed at least at two engagement locations (preferably four engagement locations) and consequently forms the corresponding interface, whilst from the beginning in the region of the hollow member root the cross-section of the elongate hollow member is unfolded. Consequently, there are no regions or portions of the elongate hollow member in the second state in which the cross-section is not unfolded. Furthermore, there are no transition regions or transition portions in which the cross-section continuously develops into the fully unfolded cross-section.

As a result of the unfolding of the hollow member root and the connection of the elongate hollow member by means of two engagement locations, that is to say, firstly the winding core and secondly the expansion mechanism, without additional measures a particularly stable connection of the unfolded hollow member to the unfolding mechanism can be produced, No further thickenings of the cross-section in the region of the hollow member root or increases of the wall thickness of the hollow member root region are required so that weight and structural space can be saved. Furthermore, no additional measures are also required to support the elongate hollow member in the root region since there is no transition region within which the bending moments which occur cannot be absorbed in an operationally reliable manner. The loads which can be carried are in this instance after unfolding significantly higher than in the unfolding mechanisms known from the prior art.

According to an embodiment, the unfolding mechanism has a locking device which locks the winding core with respect to the base structure in a rotationally secure manner when the at least one elongate hollow member is moved into the unrolled and unfolded second state. As a result of the locking of the winding core with respect to the base structure, the interface between the elongate hollow member and unfolding mechanism is fixed so that loads which occur can also accordingly be absorbed on the base structure.

According to an embodiment, each of the elongate hollow members is fixed to the respective first shell member half by means of a first engagement location on the rotatably supported winding core. The expansion mechanism has for each elongate hollow member which is secured to the winding core an insert which can be extended out of the winding core and which can be moved from a retracted first position into an extended second position. The extendable insert is always in the first retracted position when the elongate hollow member(s) is/are wound and compressed on the winding core, that is to say, is/are in the first state. In this instance, the extendable insert can be moved into the extended second position only when all the elongate hollow members are unwound from the winding core.

Each insert of the expansion mechanism has a second engagement location, by means of which the respective insert is in engagement with the second shell member half of the respective elongate hollow member. If the extendable insert is now moved from the first retracted position into the second extended position, the second shell member half which is mechanically actively connected to the extendable insert via the second engagement location is pressed away from the winding core so that the cross-section of the respective elongate hollow member is expanded in the region of the hollow member root.

Via the second engagement location, the second shell member half may be mechanically actively connected to the insert in a positive-locking, non-positive-locking and/or materially engaging manner and consequently be in engagement with the engagement location.

According to a development in this regard, the expansion mechanism has for each elongate hollow member which is secured to the winding core a third and a fourth engagement location so that an elongate hollow member is connected to the unfolding mechanism in each case by means of four engagement locations. The third and fourth engagement locations are in this instance supported on the winding core in an axially movable manner so that, when the cross-section is expanded, the hollow member root can be moved from a first position axially in the direction of the winding core center into a second position. This is because, when the cross-section is expanded in the region of the hollow member root, the two shell member halves are moved away from each other, whereby the edge regions of the compressed flat strip are moved toward each other. In order to also securely connect the elongate hollow member to the winding core in these edge regions by means of the third and fourth engagement locations, the third and fourth engagement locations are thus supported in such an axially movable manner that, when the cross-section of the hollow member root is expanded, they move axially in the direction of the winding core center and consequently complete the movement of the expanding cross-section and compensate for the relative movement.

The third and fourth engagement locations of the expansion mechanism may in this instance be mechanically actively connected to one of the inserts which can be extended out of the winding core in such a manner that, when the respective insert is extended into the second position thereof, the third and fourth engagement locations which are actively connected to this insert are also moved into the second position thereof. Both the insert with the second engagement location and the third and fourth engagement locations carry out a linear movement, wherein the direction of the linear movement of the second engagement location is perpendicular to the linear movement of the third and fourth engagement locations. Thus, the third and fourth engagement locations can be fixed in the winding core on linear bearing blocks, on which they can be axially displaced in the direction of the winding core center. In this case, the two third and fourth engagement locations are connected to one of the inserts via connection rods so that, when the insert which is connected to the engagement locations is moved from the first position into the second position, the third and fourth engagement locations are also carried as a result of the connection via the connection rods to the currently extending insert, and are forced into an axial linear movement in the direction of the winding core center as a result of the linear bearing.

In an embodiment in which precisely two elongate hollow members are arranged on the winding core, the winding core has for each of the elongate hollow members precisely one insert having a second engagement location, wherein for each elongate hollow member a third and a fourth engagement location are further provided. Accordingly, the winding core has two inserts having a total of two engagement locations and four axially movable third and fourth engagement locations. In this arrangement, it is structurally particularly advantageous for the first elongate hollow member to have a first insert to be associated with a second engagement location, wherein this first insert is then mechanically actively connected to the third and fourth engagement locations which are associated with the second elongate hollow member. This is because the first insert of the first elongate hollow member is extended at one side of the winding member and is moved into the second position, which is opposite the bearing of the third and fourth engagement locations of the second elongate hollow member. Consequently, the movement of the first insert away from the third and fourth engagement locations of the second elongate hollow member can be used to force the third and fourth engagement locations of the second elongate hollow member in their axial movement via a mechanical active connection to the first insert (for example, connection rods).

The same naturally also applies to the second insert which is associated with the second elongate hollow member which in turn axially moves the third and fourth engagement locations of the first elongate hollow member when the second insert is moved into the second position thereof.

According to an embodiment in connection with the extendable inserts, the expansion mechanism has at least one rotary spring which can be moved from a locked state into a released state and which is connected by means of a lever mechanism to at least one of the extendable inserts, preferably a plurality or all of the inserts, in such a manner that in the released state the rotary spring applies via the lever mechanism a force or a torque to the at least one insert in order to extend the corresponding insert into the second position thereof. To this end, the rotary spring may, for example, be actively connected to a rotation axle so that, in the released state of the rotary spring, it applies a torque to the rotation axle. On the rotation axle, there is a lever mechanism which is connected to the inserts by means of connection rods so that, when the rotation axle is rotated, the lever mechanism moves the connection rods or applies a force to them, whereby the inserts are moved from their first position into the second position.

The release of the locked state of the rotary spring may in this instance be carried out from the outer side by means of a corresponding pin which is moved from a first locking position into a second released position, wherein, in the first locking position, a stop abuts the locking pin and consequently prevents the rotary spring from being able to apply a corresponding force to the inserts via the lever mechanism.

According to another advantageous embodiment, one of the extendable inserts, preferably all of the extendable inserts, has/have at least one guiding pin which protrudes laterally from the winding core and which in the first position of the respective insert engages in an annular groove which is provided in the base structure of the unfolding mechanism. Accordingly, the winding core can rotate about its own axis when the inserts are retracted in the first position in the winding core since in this first position the guiding pin(s) can slide along in an unimpeded manner in the annular groove when the winding core is rotated. The annular groove in the base structure of the unfolding mechanism is consequently constructed in such a manner that it rests on the circular path of the guiding pins which is formed by the winding core with the protruding guiding pin being rotated about its own axis when the inserts are retracted in the first position.

If the inserts with the protruding pins are moved into the second position, the guiding pins engage in a linear groove provided in the base structure of the unfolding mechanism in such a manner that the winding core is locked in a rotationally secure manner with respect to the base structure. The linear groove has in this instance an end region in which the guiding pin engages when the corresponding insert has been moved into the second position, wherein this end region of the linear groove is located outside the circular path of the winding core. Consequently, the winding core can then no longer be rotated about its own axis since the guiding pin in the linear groove prevents a rotational movement in a positive-locking manner.

It is thereby possible to bring about a rotationally secure locking of the winding core together with the expansion of the cross-section of the elongate hollow member without providing an additional locking mechanism which locks the winding core in a rotationally secure manner from the outer side.

The object is further also achieved with the method according to claim 9 for unfolding at least one rolled-up elongate hollow member using an unfolding mechanism, wherein the elongate hollow member has two elongate shell member halves and is rolled up and compressed in a first state on a rotatably supported winding core of the unfolding mechanism and is intended to be moved by rotating the winding core from the first state into an unrolled and unfolded second state. The method comprises in this instance the following steps:

rotating the winding core of the unfolding mechanism in order to move the at least one rolled-up elongate hollow member from the first state into the second state, wherein, in the unrolled unfolded second state in the region of the hollow member root, the cross-section of the at least one elongate hollow member is expanded by the second shell member half being moved away from the rotatably supported winding core by means of an expansion mechanism, whilst the first shell member half is fixed to the winding core.

In an embodiment, there is provision for the winding core to be locked in a rotationally secure manner to a base structure of the unfolding mechanism by means of a locking device when the at least one elongate hollow member is moved into the unrolled and unfolded second state.

According to an embodiment, there is provision for, in order to expand the cross-section of the at least one elongate hollow member by means of the expansion mechanism, an insert which can be extended from the winding core to be moved from a retracted first position into an extended second position, wherein the insert when extended out of the winding core engages with a second engagement location in the second elongate shell member and moves it away from the rotatably supported winding core, whilst the first elongate shell member is fixed to the winding core by means of a first engagement location.

According to an embodiment, there is provision for a third and a fourth engagement location to be in engagement with the at least one elongate hollow member and for these to be displaced when the insert is moved out of the winding core in order to expand the cross-section of the hollow member root from a first position axially in the direction of the winding core center into a second position.

According to an embodiment, there is provision, during the rotation of the winding core in order to move the rolled-up elongate hollow member from the first state into the second state, for one or more guiding pin(s) of the extendable insert which protrude(s) laterally from the winding core to engage in the first position of the insert in an annular groove of a base structure of the unfolding mechanism and to be guided therein and, when the insert is moved out of the winding core in order to expand the cross-section of the hollow member root, the protruding guiding pins to engage in a linear groove which is provided in the base structure of the unfolding mechanism and to be guided therein in order to lock the winding core in a rotationally secure manner with respect to the base structure.

Figure 2:
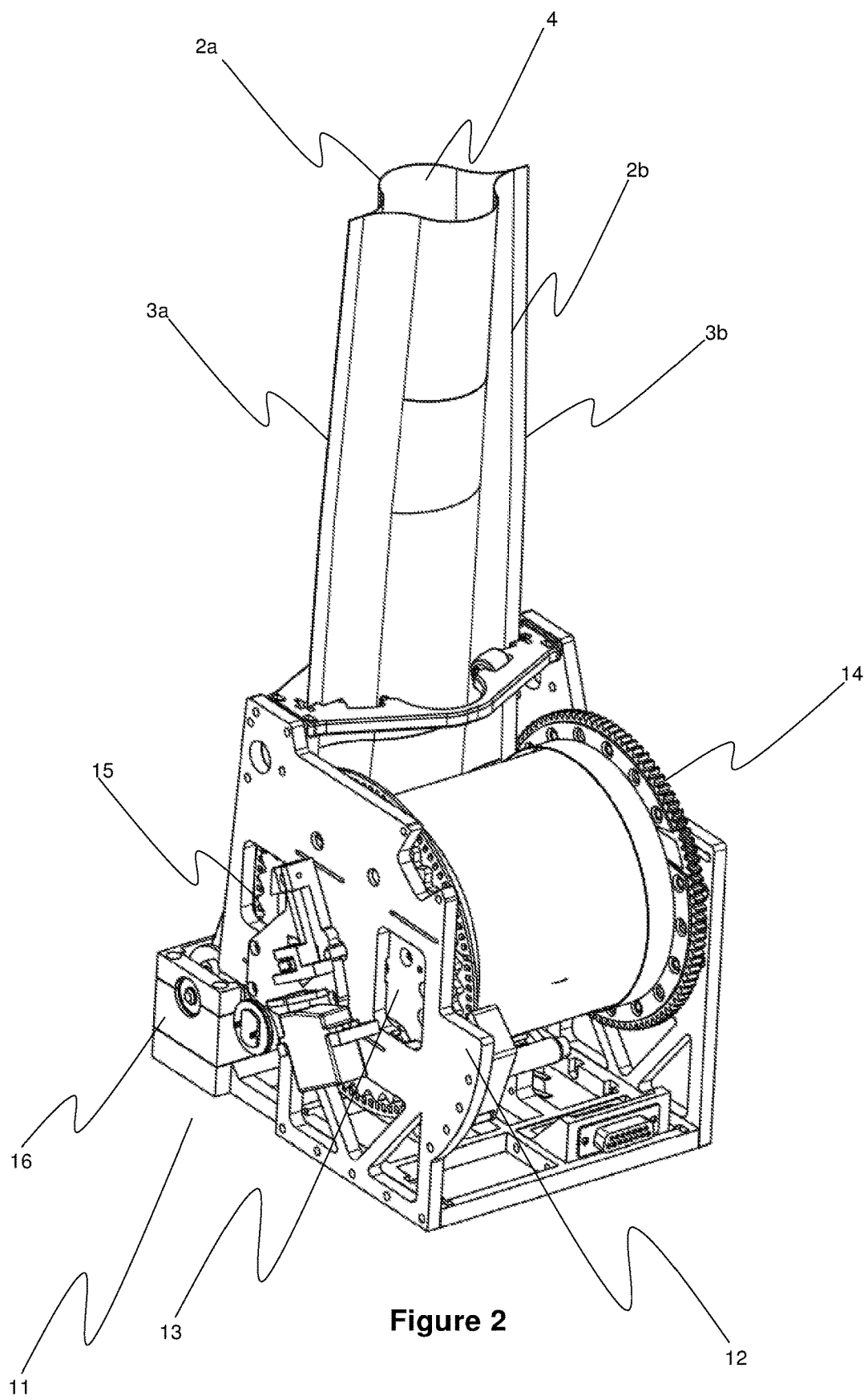
Figure 3:
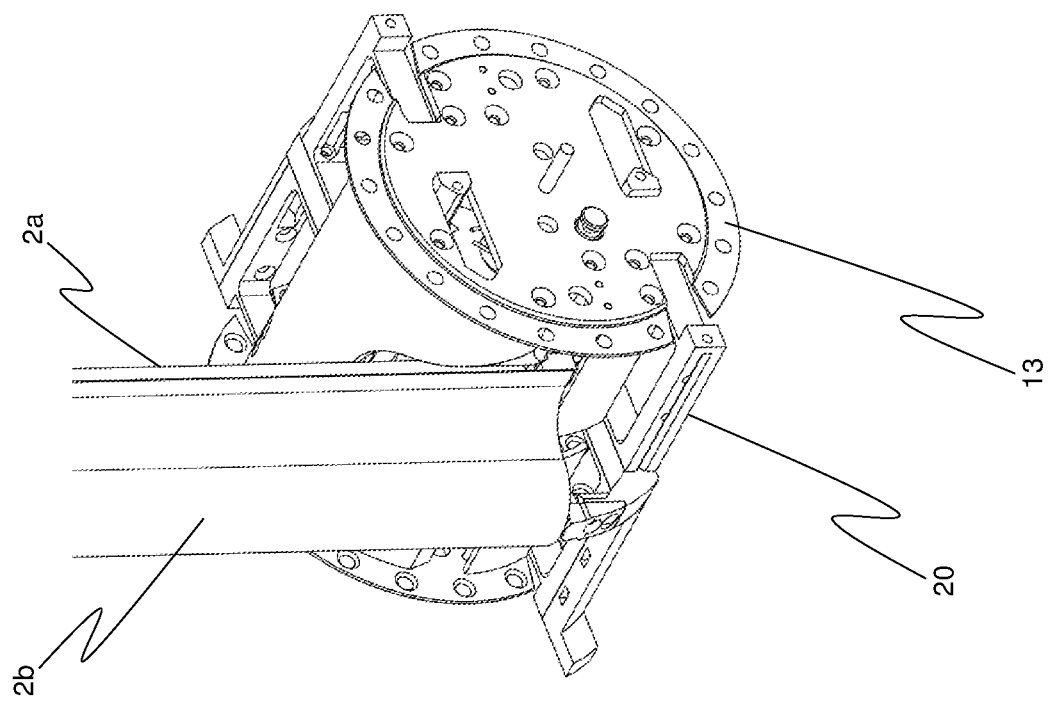
Figure 3:
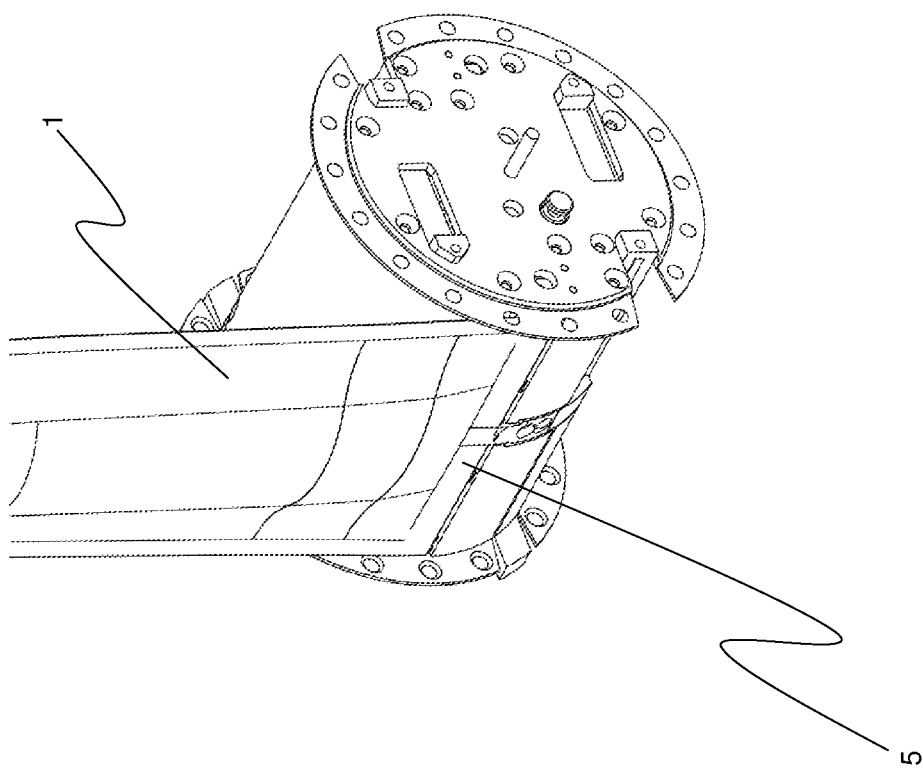
Figure 4:
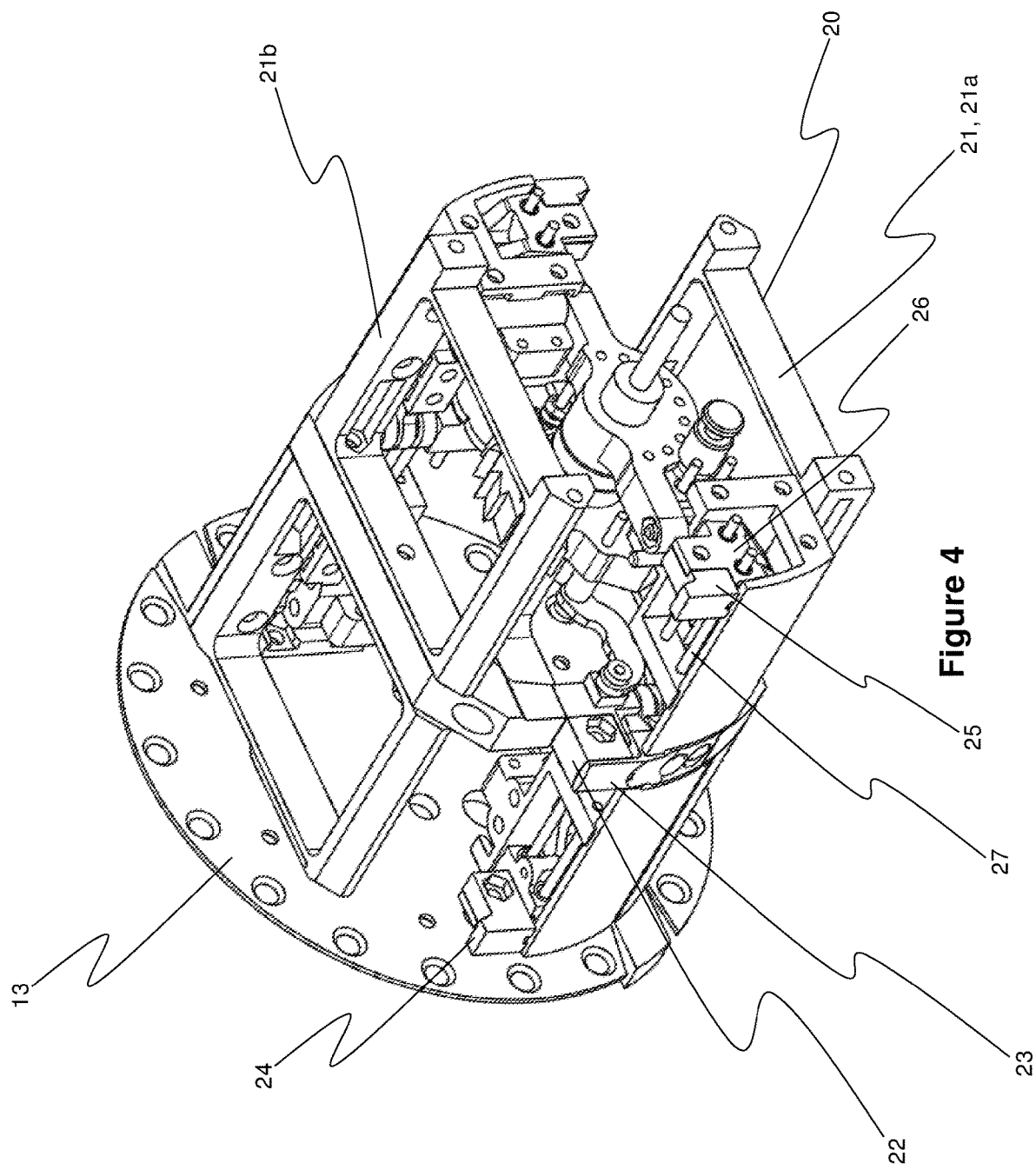
Figure 5:
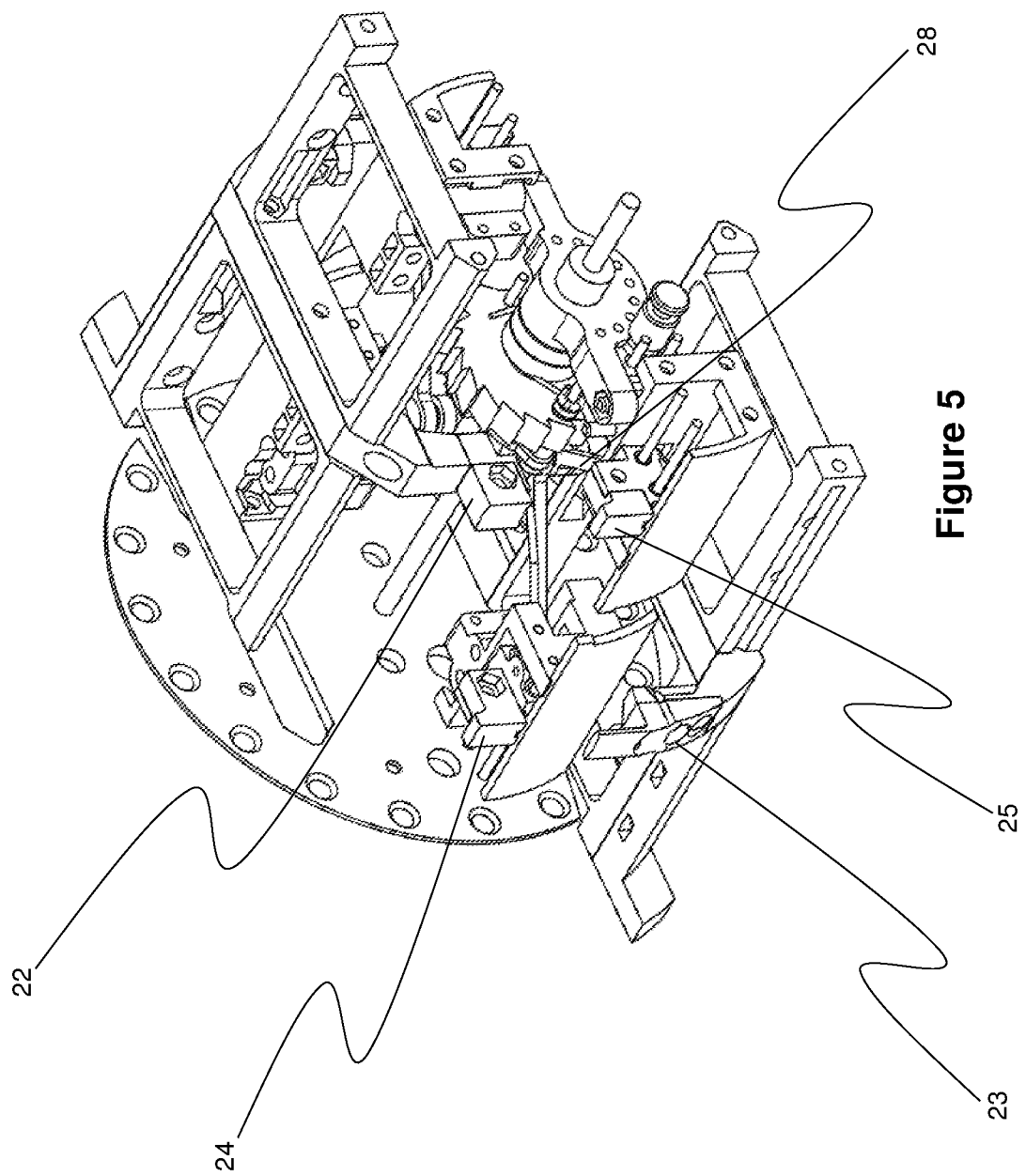
Figure 6A:
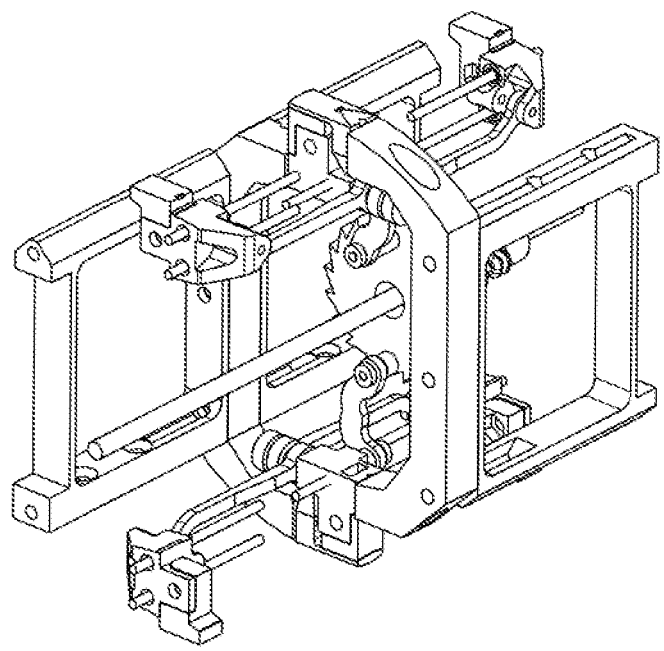
Figure 6B:
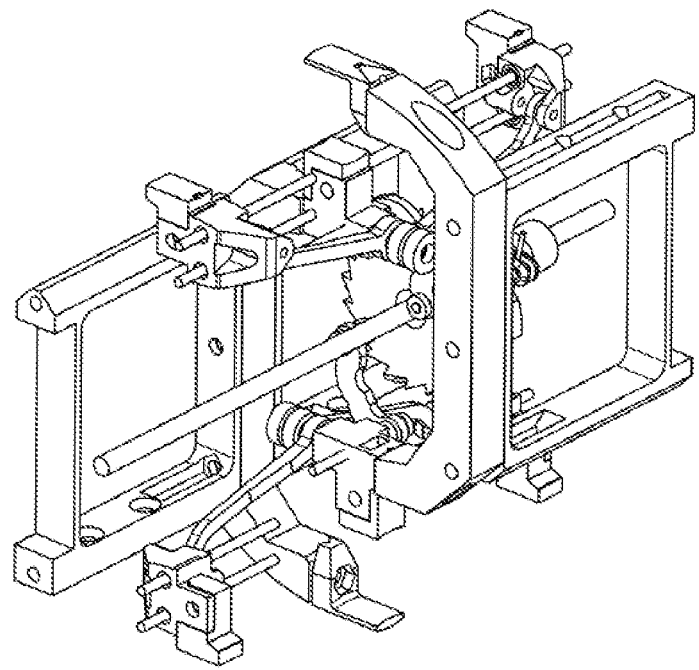
Figure 6C:
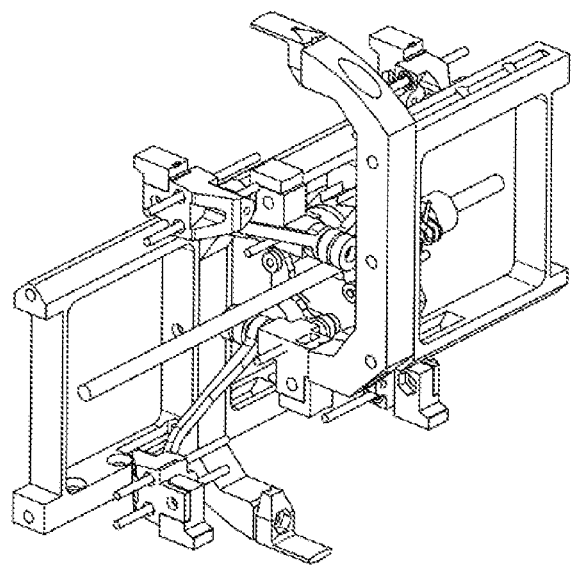
Figure 6D:
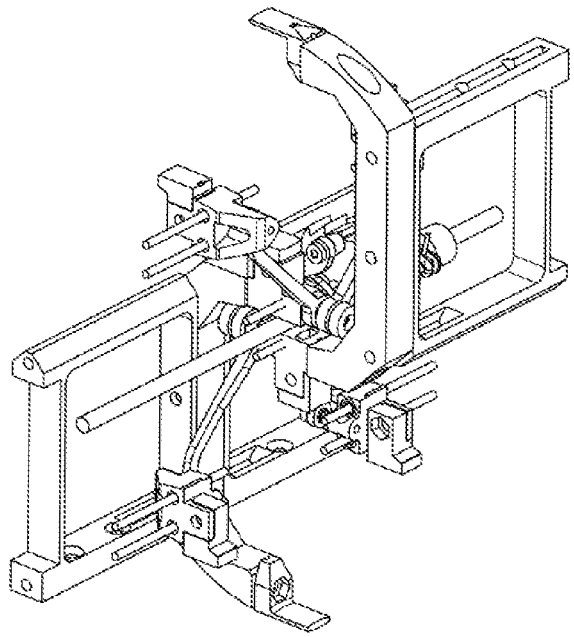
Figure 7A:
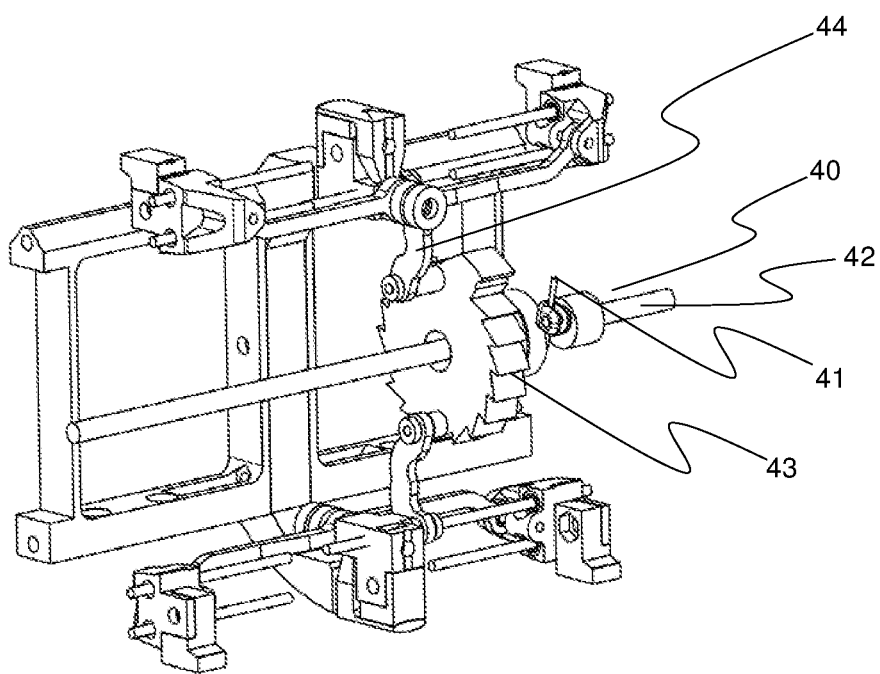
Figure 7B:
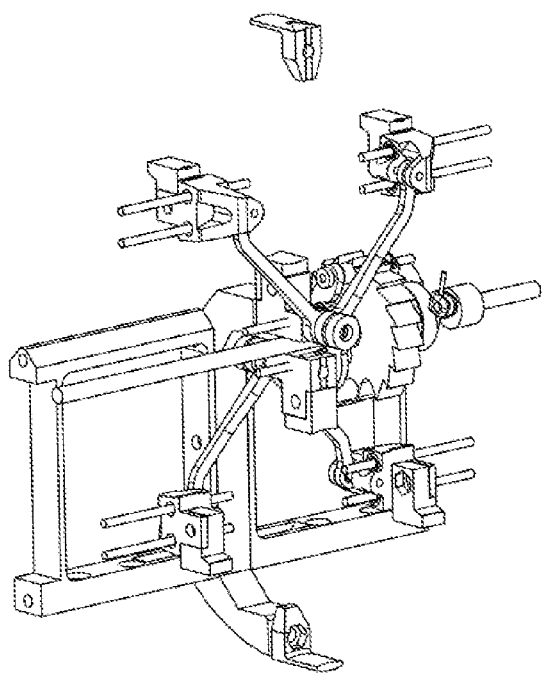
Figure 8B:
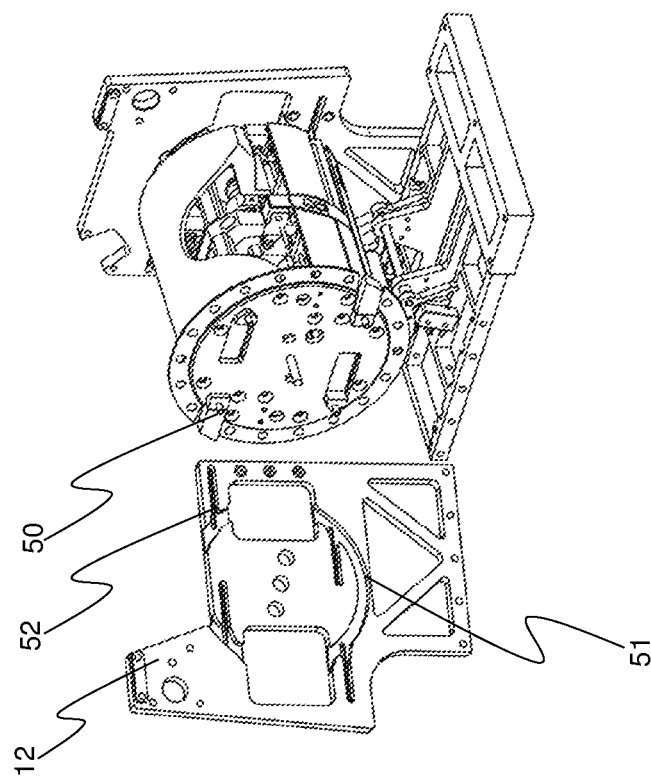
Figure 8A:
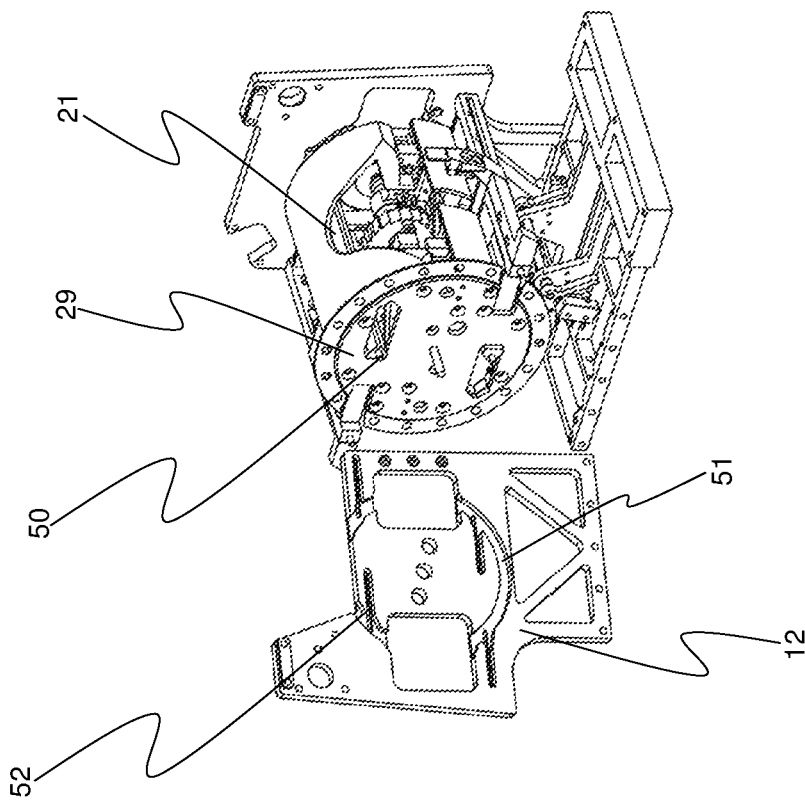

The invention is explained in greater detail below with reference to the appended Figures, in which:

FIG. 1—is a perspective illustration of a solar sail in the stored state;

FIG. 2—is a perspective illustration of a function demonstrator with only one hollow member;

FIG. 3—is an illustration of the unfolding mechanism;

FIG. 4—shows the inner mechanism in the retracted state;

FIG. 5—shows the inner mechanism in the extended state;

FIG. 6A-D—shows the released inner mechanism in different states;

FIG. 7A-B—shows a drive mechanism;

FIG. 8A-B shows a locking mechanism.

FIG. 1 is a perspective view of a solar sail having a total of four shell masts which can be rolled up in the form of elongate hollow members 1 which are stored in a device 10. The outer end of each hollow member 1 protrudes in this instance slightly from the device 10 and is connected in this instance by means of corresponding cables to a storage device 100 which is arranged below the device 10 for the solar sail. If the hollow members 1 are now moved out of the device 10, the hollow members 1 extend away from the device 10 and in this instance pull out the solar sail which is stored in the storage device 100. The solar sail shown in FIG. 1 has a total of four hollow members or masts 1 which are rolled in the device 10. However, it is also conceivable to have only one hollow member or two hollow members which can be extended using the device 1. The number of hollow members which can be stored with a device 10 is ultimately only limited by the structural space provided.

FIG. 2 is a perspective illustration of a function demonstrator with a single elongate hollow member 1 in order to explain the operating principle of a device 10 illustrated in FIG. 1 in greater detail. The device 10 illustrated in FIG. 2 with a single hollow member 1 has an unfolding mechanism 11 which has a base structure 12 in which a winding core 13 is rotatably supported. On the winding core 13, the elongate hollow member 1 is wound in the stored state and is consequently present in the first state.

The elongate hollow member 1 is in this instance compressed to form a flat strip and can thus be stored in a particularly space-saving manner.

The hollow member 1 which is compressed and rolled up on the winding core 13 has two elongate hollow member shells 2a, 2b which are joined in an edge region 3 of the elongate hollow member 1. It is thereby possible for the two hollow member shells 2a, 2b to be compressed to form a flat strip, wherein the outer edge of the elongate compressed hollow member 1 is then formed by the joint region of the elongate hollow member 1.

If the elongate hollow member is pushed outward by rotating the winding core and is thereby unfolded, the two hollow member shells 2a, 2b move away from each other, whilst the edge regions 3a, 3b move toward each other. The hollow space 4 is thereby formed and ultimately provides the elongate hollow member with its high weight-specific strength and rigidity at a very low weight.

The winding core 13 has on the edge regions thereof a flange 14 which has on one side a toothed ring 15 which is in engagement with a drive 16. The winding core 13 can be rotated via the drive 16 in order to thus unroll the winding core 13 and move it from the rolled-up and compressed first state into an unrolled and unfolded second state.

FIG. 3 shows in two illustrations the expansion of the cross-section of the elongate hollow member 1 in the region of the mast root 5. The illustration shown on the left side shows in this instance the connection of the elongate hollow member 1 in the region of the hollow member root 5 in a non-expanded state, whilst the right illustration of FIG. 3 shows the state in which the hollow member root 5 is expanded. The term "expanded" is intended in this instance to be understood to mean that, in the region of the hollow member root 5, the elongate hollow member 1 has the same or at least similar cross-section as/to in the remaining unfolded hollow member 1. At least in the region of the hollow member root 5 in the unfolded state, the elongate hollow member is no longer compressed so that a corresponding hollow space is also formed in the region of the hollow member root 5.

The elongate hollow member 1 is in this instance secured with the first elongate hollow member shell 2a thereof to the rotatably supported winding core 13, whilst the opposing second elongate hollow member shell 2b is in engagement with an expansion mechanism 20 which accordingly expands the elongate hollow member 1 in the region of the hollow member root 5. To this end, the second elongate shell member half 2b is moved away from the first shell member half 2a secured to the winding core 13 in the region of the hollow member root 5 in order to thus also construct the cross-section accordingly with a hollow space in the region of the hollow member root 5.

FIG. 4 shows in detail the expansion mechanism 20 which is constructed to expand two elongate hollow members 1 separately in the region of the hollow member root 5. In FIG. 3, in this instance for reasons of clarity, only one hollow member 1 is illustrated, wherein the second hollow member 1 is then arranged precisely on the opposite side in a state rotated through 81°. The following explanations always relate to the expansion of a hollow member, wherein the operating principle can be readily transferred in each case to the other hollow member.

FIG. 4 shows an expansion mechanism 20, which has at least one insert 21, which is illustrated in the winding core 13 in FIG. 4 in a retracted first state. FIG. 5 shows in this instance the same mechanism in the extended second state. On the winding core 13 is a first engagement location 22, at which in the region of the hollow member root 5 the first shell member half 2a is secured. This securing at the first engagement location 22 may in this instance be carried out in a positive-locking, non-positive-locking and/or materially engaging manner.

On the insert 21 of the expansion mechanism 20, there is further located a second engagement location 23 which engages in the form of a locking projection in the hollow space formed between the first elongate shell member half 2a and the second elongate shell member half 2b and in this instance is in engagement with the second elongate shell member half 2b in such a manner that the second shell member half 2b moves away or is pressed away from the first shell member half 2a when the insert 21 is extended.

The extended state can be seen in this instance in FIG. 5. There has been produced between the first engagement location 22 and the second engagement location 23 a corresponding distance which substantially corresponds to the hollow space dimension of the elongate hollow member 1. The engagement location 23 in the form of a protruding projection or locking projection in this instance abuts the inner wall of the second elongate shell member half 2b and consequently supports it accordingly. Also in this instance, another positive-locking, non-positive-locking and/or materially engaging connection to the second shell member half 2b is conceivable.

Furthermore, the expansion mechanism 20 has a third engagement location 24 and a fourth engagement location 25 which can carry out a translational movement in the direction of the winding core center. That is to say, the third engagement location 24 and the fourth engagement location 25 move when the hollow member root 5 is expanded in the direction of the first engagement location 22 and thus compensate for the relative movement when the hollow member root 5 is expanded. At the same time, they act as an at least positive-locking connection for the other support of the entire hollow member and thus form with the remaining engagement locations the interface between the hollow member 1 and the unfolding mechanism 11.

The third and fourth engagement locations 24, 25 are in this instance supported in a linearly displaceable manner, wherein, in the embodiment of FIG. 4, the engagement locations are arranged on linear bearing blocks 26 which in turn are supported in an axially movable manner in a linear bearing 27.

In the embodiment of FIGS. 4 and 5, which is illustrated one again in detail in FIG. 6 in an exposed view, the third and fourth engagement locations 24 and 25 are driven by the opposing insert 21b by the linear bearing blocks 26 of the third and fourth engagement locations 24, 25 being connected thereto by means of connection rods 28. If the opposing second insert 21b moves away from the first engagement location 22 and the third and fourth engagement locations 24 and 25, a force is produced on the linear bearing blocks 26 which as a result of their linear bearing 27 are then moved axially in the direction of the winding core center or in the direction of the first engagement location 22. The opposing insert is thereby always used to move the other third and fourth engagement locations of the other elongate hollow member axially in the direction of the winding core center.

FIG. 6 shows the exposed inner mechanism in the manner of a flip book in different states. In the upper image, it can be seen that the inserts 21a and 21b are retracted. Gradually, the inserts are then extended in order to thus expand the cross-section, wherein the third and fourth engagement locations of the other hollow member in each case are moved in the direction of the winding core center. The completely extended state, as known from FIG. 5, is shown in the lower image of FIG. 6.

FIG. 7 shows by way of example the drive mechanism 40 in order to be able to accordingly carry out the extension of the inserts 21. To this end, a rotary spring 41 is provided and is connected at one side securely to the structure and is actively connected at the other side to a rotation axle 42 on which a lever mechanism 43 is arranged. If the rotary spring is now moved from a locked state into a released state, using the rotary spring 41a force is transmitted to the inserts 21 which are mechanically actively connected to the rotation axle 42 and the lever mechanism 43 by means of connection rods 44. The connection rods 44 engage in this instance in each case on a rear end of the inserts 21 and thus pull them in the direction of the rotation axle 42 which also forms the rotation axis of the winding core 13. As a result of the fact the respective rear end of an insert is pulled in the direction of the rotation axle 42, the inserts are pushed with the front sides thereof out of the winding core 13 and can thus carry out their expansion effect.

This state that the insert which is illustrated in FIG. 7 is pulled in the direction of the rotation axle 42 is illustrated in the lower illustration of FIG. 7.

The lever mechanism 43 may in this instance have on the outer periphery thereof a locking device which serves to be in engagement with the locking mechanism of the rotary spring so that a locking of the rotary spring is thereby enabled. To this end, for example, a counter-element engages in the detent of the lever mechanism 43 and thus locks the rotary spring. If this detent is removed, a corresponding force can be applied via the connection rods 44 to the inserts.

FIG. 8 shows the locking mechanism by means of which the winding core 13 is intended to be locked in a rotationally secure manner. To this end, the inserts 21 have in an exploded view outwardly protruding guiding pins 50 which protrude from the side face 29 of the winding core 13. In the retracted first state of the inserts 21, these guiding pins 50 engage in an annular groove 51 so that the winding core 13 can be freely rotated about its own axis. As a result of the annular groove 51, the rotational movement of the winding core 13 is not prevented by a corresponding positive-locking connection.

In the end position thereof, the inserts 21 are then extended into the second position thereof, whereby the guiding pins 50 move in a linear or translational manner. In this instance, a linear groove 52 is provided, in which a corresponding guiding pin 50 is introduced when the corresponding insert is extended into the second position. A positive-locking connection is thereby generated and prevents the winding core 13 from being able to rotate about its own axis since the guiding pins outside the annular groove 51 now lock the winding core 12 in a rotationally secure manner.

This positive-locking action is in this instance shown in the lower illustration in FIG. 8.

LIST OF REFERENCE NUMERALS

1—Hollow member
2*a*—First hollow member half
2*b*—Second hollow member half
3*a*—First edge region
3*b*—Second edge region
4—Hollow space of the hollow member
5—Hollow member root
10—Device
11—Unfolding mechanism
12—Base structure
13—Winding core
14—Flange of the winding core
15—Toothed ring
16—Drive of the winding core
20—Expansion mechanism
21—Insert
21*a*—First insert
21*b*—Second insert
22—First engagement location
23—Second engagement location
24—Third engagement location
25—Fourth engagement location
26—Linear bearing blocks
27—Linear bearing
28—Connection rods
29—Side face of the winding core
40—Drive mechanism
41—Rotary spring
42—Rotation axle
43—Lever mechanism
44—Connection rods
50—Guiding pin
51—Annular groove
52—Linear groove
100—Storage device

The invention claimed is:

1. A device for unfolding a rolled-up elongate hollow member, comprising:
at least one elongate hollow member which has two elongate shell member halves,
an unfolding mechanism which has a fixed base structure and a winding core which is rotatably supported on the base structure, wherein the at least one elongate hollow member in a first state is rolled up on the unfolding mechanism and compressed, wherein by rotating the unfolding mechanism moves and unfolds the at least one elongate hollow member from the first state into an unrolled and unfolded second state so that an elongate hollow space is formed between the two shell member halves of the at least one elongate hollow member,
wherein the at least one elongate hollow member has as a first end a hollow member root, wherein the at least one elongate hollow member is secured to the rotatably supported winding core by the hollow member root,
wherein the first shell member half of the at least one elongate hollow member is secured in a region of the hollow member root to the rotatably supported winding core, and
wherein the unfolding mechanism has an expansion mechanism which in the region of the hollow member root is in engagement with the second shell member half, wherein the expansion mechanism moves the second shell member half in the region of the hollow member root away from the rotatably supported winding core in order to expand a cross-section of the at least one elongate hollow member in the region of the hollow member root when the at least one elongate hollow member is unrolled from the rotatably supported winding core.

2. The device according to claim 1, wherein the unfolding mechanism has a locking device which rotationally securely locks the winding core with respect to the base structure when the at least one elongate hollow member is moved into the unrolled and unfolded second state.

3. The device according to claim 1, wherein each elongate hollow member is fixed to the respective first shell member half by a first engagement location on the rotatably supported winding core and the expansion mechanism has an insert for each elongate hollow member secured to the winding core, wherein each insert is extendable out of the winding core, wherein each insert is movable from a retracted first position into an extended second position, wherein each insert is in engagement via a second engagement location with the second shell member half of the respective elongate hollow member such that the cross-section of the respective elongate hollow member is expanded in the region of the hollow member root when the respective insert is moved into the second position.

4. The device according to claim 3, wherein the expansion mechanism has for each elongate hollow member secured to the winding core a third and a fourth engagement location, wherein the third and fourth engagement locations are in engagement with the respective elongate hollow member, wherein the third and fourth engagement locations are supported on the winding core and are axially movable on the winding core, when the cross-section of the hollow member root is expanded, are moveable from a first position axially in the direction of the winding core center into a second position.

5. The device according to claim 4, wherein the third and fourth engagement locations of the expansion mechanism are mechanically connected to one of the inserts, wherein when the respective insert is extended into the second position thereof, the third and fourth engagement locations connected to this insert are also moved into the second position thereof.

6. The device according to claim 4, wherein two elongate hollow members are secured on the winding core and the expansion mechanism for each elongate hollow member has in each case an extendable insert and third and fourth engagement locations wherein the extendable insert of the first elongate hollow member is mechanically actively connected to the third and fourth engagement locations of the second elongate hollow member such that when the insert of the first elongate hollow member is extended into the second position thereof, the third and fourth engagement locations of the second elongate hollow member are also moved into the second position thereof.

7. The device according to claim 3 wherein the expansion mechanism has at least one rotary spring, wherein the at least one rotary spring is moveable from a locked state into a released state, wherein the at least one rotary spring is connectable by a lever mechanism to at least one of the extendable inserts such that in the released state of the rotary spring a force is applied via the lever mechanism to the at least one insert in order to extend the corresponding insert into the second position thereof.

8. The device according to claim 3 wherein at least one of the extendable inserts has at least one guiding pin, wherein the at least one guiding pin protrudes laterally from the winding core, wherein in the first position of the insert the at least one guiding pin engages in an annular groove in the base structure of the unfolding mechanism, and wherein in the second position of the insert the at least one guiding pin engages in a linear groove provided in the base structure of the unfolding mechanism such that the winding core is rotationally securely locked with respect to the base structure.

9. A method for unfolding at least one rolled-up elongate hollow member by an unfolding mechanism, wherein the at least one rolled-up elongate hollow member has two elongate shell member halves, wherein the at least one elongate hollow member in a first state is rolled up and compressed on a rotatably supported winding core of the unfolding mechanism and is designed to be moved by rotating the winding core from the first state into an unrolled and unfolded second state, comprising:
rotating the winding core of the unfolding mechanism to move the at least one rolled-up elongate hollow member from the first state into the second state,
wherein, in the unrolled unfolded second state in the region of the hollow member root, the cross-section of the at least one elongate hollow member is expanded by the second shell member half being moved away from the rotatably supported winding core by an expansion mechanism, whilst the first shell member half is fixed to the winding core.

10. The method according to claim 9, wherein the winding core is rotationally securely locked to a base structure of the unfolding mechanism by a locking device when the at least one elongate hollow member is moved into the unrolled and unfolded second state.

11. The method according to claim 9, wherein, to expand the cross-section of the at least one elongate hollow member by the expansion mechanism, an insert extendible from the winding core is moved from a retracted first position into an extended second position, wherein the insert when extended out of the winding core engages with a second engagement location in the second elongate shell member and is moved away from the rotatably supported winding core, whilst the first elongate shell member is fixed to the winding core by a first engagement location.

12. The method according to claim 11, wherein a third and a fourth engagement location are in engagement with the at least one elongate hollow member and they are displaced when the insert is moved out of the winding core to expand the cross-section of the hollow member root from a first position axially in the direction of the winding core center into a second position.

13. The method according to claim 11 wherein during rotation of the winding core, to move the rolled-up elongate hollow member from the first state into the second state, guiding of the insert extendible from the winding core to protrude laterally from the winding core to engage in the first position of the insert in an annular groove of a base structure of the unfolding mechanism, wherein when the insert is extended out of the winding core in order to expand the cross-section of the hollow member root, the protruding guiding pins engage in a linear groove in the base structure of the unfolding mechanism and are guided therein in order to rotationally securely lock the winding with respect to the base structure.

* * * * *